March 23, 1971  R. P. JONAS  3,572,106
MEANS FOR MEASURING ANGULAR DISPLACEMENT OF
COAXIALLY ROTATING ELEMENTS
Filed Sept. 26, 1969  2 Sheets-Sheet 1

INVENTOR.
ROBERT P. JONAS
BY
Herschel C Omohundro
attorney

INVENTOR.
ROBERT P. JONAS
BY
Herschel C. Omohundro
attorney

United States Patent Office 3,572,106
Patented Mar. 23, 1971

3,572,106
MEANS FOR MEASURING ANGULAR DISPLACEMENT OF COAXIALLY ROTATING ELEMENTS
Robert P. Jonas, Phoenix, Ariz., assignor to The Garrett Corporation, Los Angeles, Calif.
Filed Sept. 26, 1969, Ser. No. 861,393
Int. Cl. G01l 3/10
U.S. Cl. 73—136                                    11 Claims

ABSTRACT OF THE DISCLOSURE

This torque meter has two disks disposed side by side and fixed to axially spaced points on a shaft, magnetic recordings of one configuration extending around the perihphery of one disk and magnetic recordings of another configuration extending around the periphery of the other disk. It also has a single magnetic head disposed to sense the magnetic flux from the recordings on both rotating disks to produce two distinct signals appearing alternately with time. The signals from the magnetic head are fed to a circuit that responds to both signals to produce a rectangular wave wherein the difference between adjacent half cycles is related to the relative rotary movement of the disks.

BACKGROUND OF THE INVENTION

This invention relates generally to instrumentation and more particularly to a meter for measuring torque in a rotating shaft.

To measure output torque, turboprop engines are equipped with electromagnetic transducers. A typical prior art transducer has two spaced steel disks with peripheral teeth mounted on the engine shaft. One disk is fixed to the shaft at one point and the other is fixed to the shaft at another point spaced approximately twelve inches from the first through the aid of a tubular member. Adjacent the periphery of the disks is a stationary margnetic pickup with dual heads. When the shaft rotates, the disk teeth change the reluctances of the magnetic circuits and induce an approximately sinusoidal voltage in each head. At zero torque, the teeth of the two disks are aligned and the head outputs are in phase. When torque is applied, the shaft twists, producing a proportional phase shift between the outputs. Two circuits are needed to detect a negative going zero crossing to produce trigger pulses. These pulses trigger a bistable multivibrator circuit to produce a rectangular wave. The on-off ratio of the circuit, or the difference between adjacent half cycles, is related to torque.

SUMMARY OF THE INVENTION

An object of the present invention is to eliminate certain parts of the prior torque measuring devices and provide a simpler mechanism which will give improved results without requiring attention or service.

Another object of the invention is to reduce the complexity of prior torque measuring devices by providing a single magnetic head and means on a shaft for causing the head to generate compound signals in response to torque applied through the shaft, the signals being supplied to a single circuit wherein waves of a predetermined character are produced, the waves changing in accordance with variations in the torque applied to the shaft.

A further object of the invention is to provide a torque measuring device having a pair of nonmagnetic disks disposed in close side-by-side relation but secured to axially spaced portions of a shaft so that twist in the shaft will impart relative angular motion to the disks, each disk having a predetermined arrangement of magnetic elements thereon operative upon the rotation of the shaft to cause the generation of signals in a magnetic pickup head supported adjacent the disks and connected in a circuit which functions to combine the signals and produce a wave with characteristics which vary as the shaft tends to wind up or unwind in response to changes in torque applied thereto.

A still further object of the invention is to provide a torque measuring device of the type mentioned in the preceding paragraph in which the magnteic elements in one form comprise short lengths of steel wire embedded in the peripheral edges of the disks, the polarity of the elements in one disk being reversed from that of the elements in the other so that electric pulses of contrasting form will be produced with a single pickup head and only one output circuit, the latter functioning to convert the pulses to a wave with predetermined characteristics depending upon the torque being transmitted by the shaft.

These and other objects and features of the present invention will become apparent from a review of the following description when taken in conjunction with the appended claims and drawings.

DESCRIPTION OF THE PREFERRED EMBODIMENTS

Figure 1:
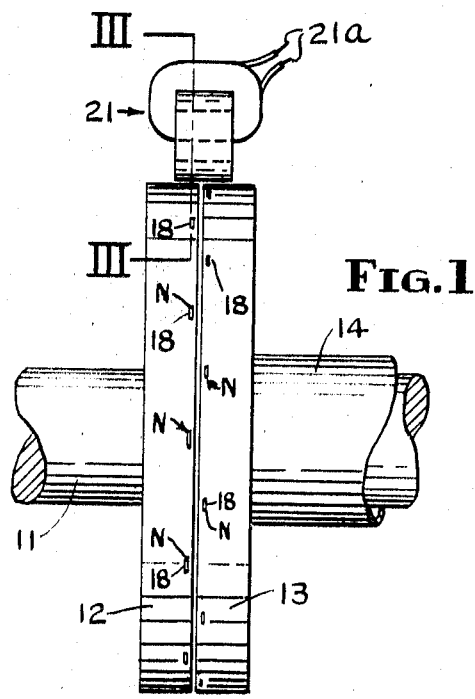
FIG. 1 is a side elevational view of a shaft provided with parts of a torque measuring means embodying the present invention.
Figure 2:
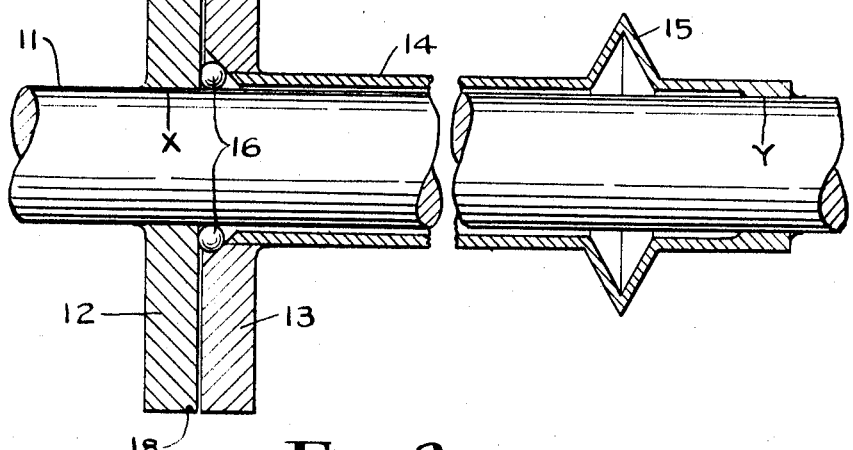
FIG. 2 is an axial sectional view of the shaft and torque measuring means shown in FIG. 1.

Referring more particularly to FIGS. 1 and 2 of the drawings, there is shown a shaft 11 for transmitting power. As is well known in the art, when power is transmitted via a shaft to perform work, the resistance exerted by the load tends to cause the shaft to twist, or in the vernacular, "wind up." It has been found that the power or "torque" being transmitted at any particular time by a shaft bears a predetermined relation to the amount of twist or windup of the shaft at such time, assuming a constant temperature and properly designed shaft. It has also been determined that the torque can be relatively accurately ascertained by measuring the amount of twist or windup in a predetermined portion of the shaft, such as that represented by the length extending between points X and Y of FIG. 2. To perform such a measuring operation, the mechanism of the present invention has been provided. This mechanism, in the form of the invention selected for illustration, includes a pair of disks 12 and 13, the former being directly secured to the shaft 11 at point X and the latter being secured to rotate with the shaft at point Y. These points, as previously mentioned, are spaced a predetermined axial distance along the shaft. Disks 12 and 13 are arranged in close side-by-side order (for example, .005 inch), a tubular section 14 serving to transmit rotary movement of the shaft at point Y to the disk 13. Section 14 is rigidly fastened at one end to the shaft at point Y and to disk 13 at the other end. If desired, tube 14 can include bellows 15 or other means to accommodate change in length of shaft 11 due to the twist or windup and to maintain disk 13 as close as required to disk 12. In the form of the invention shown, antifriction bearings 16 are positioned between the disks to prevent either from resisting turning movement of the other. It should be obvious from the description thus far that if torsional deflection or windup of the shaft between points X and Y should occur, a corresponding relative angular displacement of disks 12 and 13 about the shaft axis will take place. Such angular displacement or relative rotation of the disks is a measure of the twist or windup of that portion of the shaft extending between points X and Y.

Figure 3:
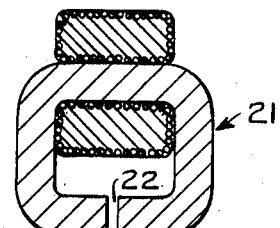
FIG. 3 is a fragmentary sectional view taken through a part of the torque measuring means on the plane indicated by the line III—III of FIG. 1.

As shown in FIGS. 1, 2 and 3, disks 12 and 13 have magnetic elements 18 embedded in the peripheral edges thereof along the sides nearest the other disk. It is obvious that when the magnetic elements are embedded therein, disks 12 and 13 must be made of some nonmagnetic material such as, for example, titanium. Elements 18 may be made of suitable material and size, an operative device built to demonstrate and prove the principles of the invention having magnets of steel wire .003 inch in diameter and .025 inch long located at 30-degree intervals around disks two inches in diameter. Any other suitable size magnets and disks may be employed. It would be possible, for example, to form the disks of any desired material and to apply suitably oriented magnetic recordings to the peripheries thereof.

Reference to FIG. 1 will show that the magnetic elements 18 extend circumferentially of the disks and those on one disk are reversely arranged from those on the other disk. For example, the elements 18 on the disk 12 have the N-poles pointing in one direction, which is up, as the disk is viewed in FIG. 1, while the elements 18 on disk 13 have the N-poles pointing in the opposite direction, or down, as the disk is viewed in FIG. 1. When the shaft 11 revolves, the edges of the disks with the magnetic elements 18 thereon pass in close proximity to a magnetic pickup head 21 suitably supported adjacent the peripheries of the disks. Head 21 is a substantially conventional unit having a C-shaped ferromagnetic core with a narrow air gap 22. In the operative device previously referred to, the gap was .250 inch long by .004 inch wide. The head is so arranged that the gap 22 extends axially relative to the shaft and disk assembly, and thus transversely of the path of travel of the magnetic elements 18 on both disks. A coil of wire is wound in the usual manner around the core, and leads 21a extend from the head. The head is positioned relatively close to the edges of the disks 12 and 13, and when the shaft revolves the magnetic fields of the elements 18 pass through the head and generate pulses of voltage in the coil. Since the elements 18 on one disk are reversely arranged as to N-poles of the elements on the other disk, the polarity of the voltage pulses will be reversed, as shown by the waveforms "a" and "b" in curves A and B of FIG. 5. An inspection of curve A in this figure shows that the waveform "a" starts from zero and travels in a negative direction, then reverses and extends in a positive direction, after which it again reverses and returns to zero. In curve B the waveform "b" starts from zero and goes in a positive direction, then reverses and travels in a negative direction, then reveress and returns to zero.

Figure 5:
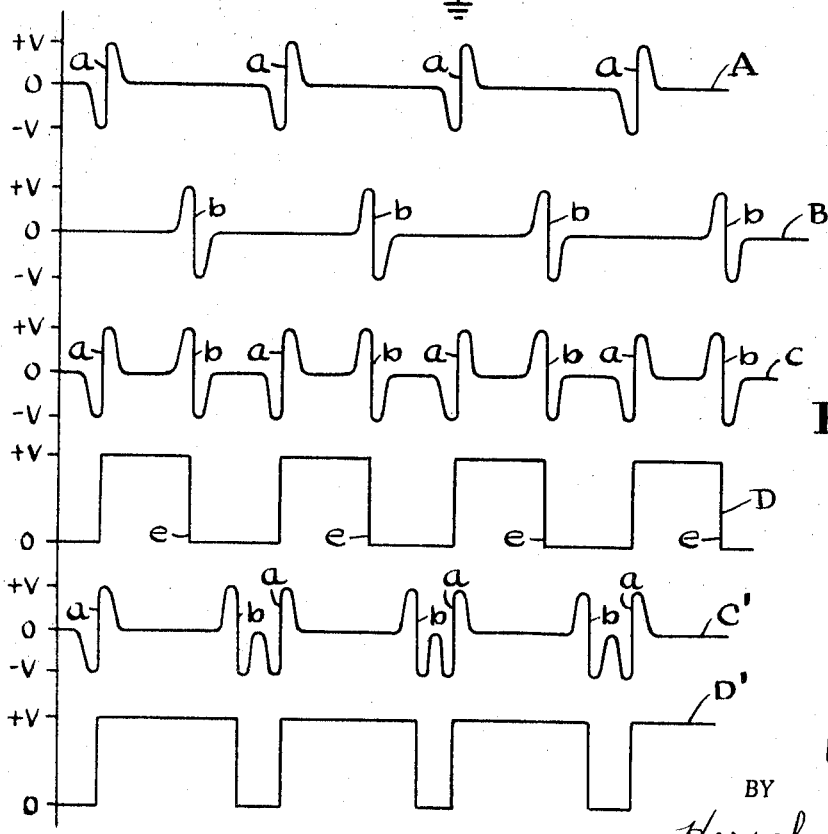
FIG. 5 includes various wave forms to explain the operation of the embodiment of the invention shown.

It should be obvious that as the shaft revolves, a composite series of voltage pulses will be generated in the magnetic pickup head 21. Preferably, the disks 12 and 13 are relatively disposed so that when the shaft is completely unloaded the magnetic elements on one disk will be equally spaced circumferentially between the elements on the other disk. Curve C in FIG. 5 shows the composite wave form representing the voltage pulses when the shaft revolves under such condition. When the shaft is loaded while revolving, torsional deflection or windup in the shaft will occur and the elements 18 on one disk will be angularly displaced relative to those on the other disk. This deflection will cause a change in the relative time of occurrence of the voltage pulses produced in the head by the different disks, the pulses produced by the disk secured nearest the end of the shaft to which the load is applied tending to occur later relative to the pulses produced by the other disk than at the initially set time. The length of time delay will, of course, depend upon the load which will in turn determine the magnitude of windup of the shaft. Since the apparatus produces a composite series of voltage pulses, and certain portions of such pulses are utilized to provide desired indications, the direction of rotation of the shaft will make a difference. It is believed that a complete understanding of the invention can be secured by assuming that the shaft will be normally driven in but one direction.

Figure 4:
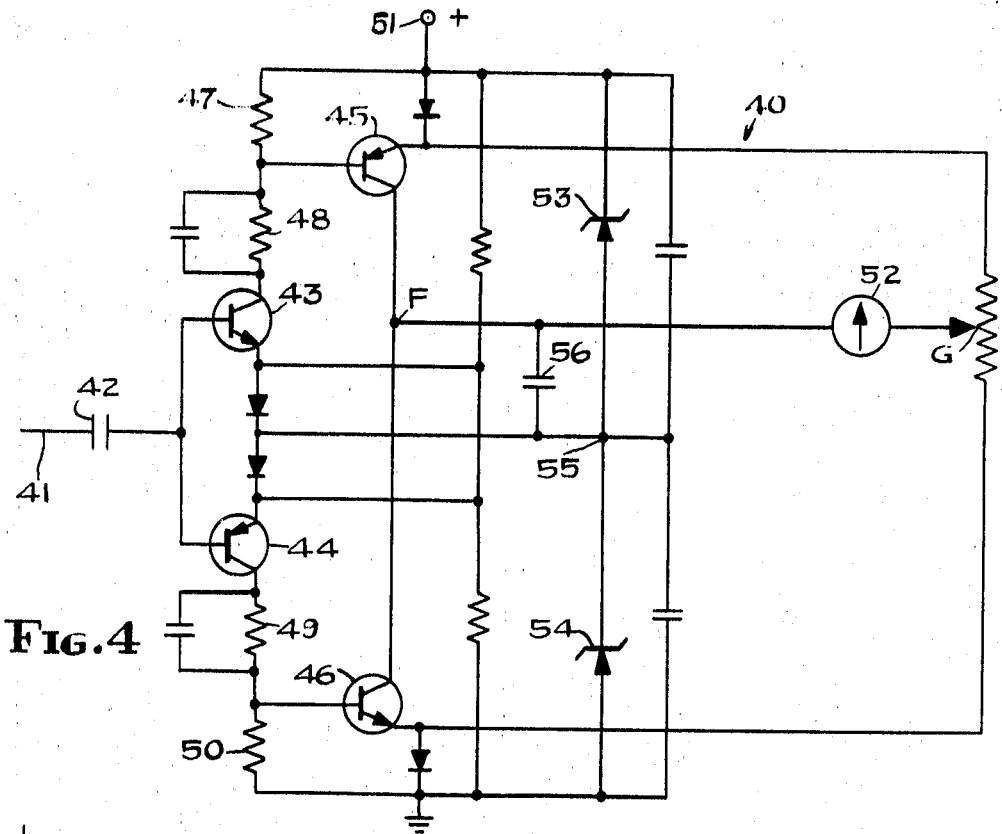
FIG. 4 is a schematic view of an electronic circuit employed in the torque measuring means to produce a rectangular wave.

To utilize the voltage pulses for providing an indication of the relative angular displacement of the elements 18 on the disks 12 and 13 and consequently the torque being transmitted by the shaft, an electronic circuit, such as that designated by the numeral 40 in FIG. 4, has been devised. This circuit serves to convert the voltage pulses into a series of rectangular waves with certain portions having lengths determined by the time periods elapsing between the voltage pulses produced by the magnetic elements on one disk and those produced by the magnetic elements on the other disk. The time periods are variable, as pointed out above, and bear a relation to the amount of twist or windup of the shaft. Circuit 40 has an input line 41 to which one of the leads 21a from the head 21 is connected, either directly or preferably through an amplifier. The other lead 21a is connected with ground. Circuit 40 also includes a pair of transistors 43 and 44 with the bases thereof connected to input line 41 through a capacitor 42. A second pair of transistors 45 and 46 have their bases connected, respectively, to junctions between series connected resistors 47 and 48 and between similarly connected resistors 49 and 50. The first set of resistors is connected at one terminal to the collector of the transistor 43 while the other terminal is connected to a source of positive power 51. The second set of resistors is connected at one terminal to transistor 44 and at the other terminal to ground. Transistors 43 and 44 are connected by a pair of diodes arranged in series. Transistor 45 is connected through a diode with the positive power source 51, while transistor 46 is connected through a similar element with ground. A junction F between these transistors is connected through a meter 52 or other suitable indicator with a potentiometer. The resistance element G of the potentiometer is connected at its ends with the junctions between the transistors 45, 46 and the diodes. A pair of series connected resistors is connected across the positive power source and ground, a junction between these resistors being connected with junctions between transistors 43, 44 and the diodes therebetween. A pair of series connected Zener diodes 53, 54 is also connected across the positive power source and ground, and a junction 55 between these elements is connected with a junction between the pair of series arranged diodes connected between transistors 43 and 44. A capacitor 56 is connected across junctions F and 55. Capacitors are also connected across Zener diodes 53 and 54.

In the illustrated form of the invention, the circuit 40 is designed to convert the voltage pulses into a train of rectangular waves in which the voltage changes between zero, or other minimum, and a selected positive maximum. It is obvious that the system could be reversed to utilize rectangular waves with negative voltage if desired. The circuit operates as follows:

Normally, i.e. when shaft 11 is at rest, none of the transistors are conducting. When, however, the shaft is rotating and the system is in operation, the composite series of voltage pulses will be generated and applied to circuit 40 through the input 41, pulses "a" and "b" ordinarily arriving intermittently. When a pulse "a" is applied, the positive portion thereof causes transistor 43 to conduct. Part of the conducted current passes through the base-emitter junction of transistor 45, causing it to conduct and charge capacitor 56. The positive portion of the next occurring pulse "b" keeps transistors 43 and 45 in conducting condition to maintain capacitor 56 charged until the negative portion of pulse "b" turns off transistors 43 and 45 and causes transistor 44 to conduct and turn on transistor 46, which conducts and effects the discharge of capacitor 56, as represented by point e on curve D of FIG. 5. The negative portion of the next occurring pulse "a" causes transistors 44 and 46 to continue to conduct, but since capacitor 56 has been discharged, it remains in its discharged state until the positive portion of pulse "a" again causes transistors 43 and 45 to conduct, and once more charge capacitor 56. The positive portion of the next pulse "b" keeps transistors 43 and 45 in conducting condition as before, thus maintaining the charged state of capacitor 56 until the negative portion of such pulse "b" again causes transistors 43 and 45 to stop conducting and transistors 44 and 46 to conduct and discharge capacitor 56. It will be noted that when the system is in operation, capacitor 56 is charged by the positive portions of pulses "a" and remains charged until the negative portions of succeeding pulses "b" occur, thus producing a train of recangular waves represented by the curve D in FIG. 5.

The circuit 40 is so arranged that the average level of the voltage at point F minus a constant voltage will be applied to and indicated on meter 52. This meter is so constructed that it will respond to the average voltage and the indications will be substantially maintained in spite of a possible voltage ripple.

When the shaft is unloaded and the magnetic elements on one disk are disposed substantially equidistantly between the elements on the other disk, the rectangular waves on curve D of FIG. 5 are substantially equal in length to the spaces between the waves. When a load is applied to the shaft, relative angular movement, from the initial setting, will take place between the disks and the magnetic elements on one disk will pass the pickup head later in point of time than at the initial setting. This time delay will be reflected by a change in the spacing between voltage pulses "a" and "b" as indicated by curve C' of FIG. 5, and the high-voltage portion of the rectangular wave will correspondingly increase in length while the low-voltage portion will decrease. The resulting train of modified rectangular waves is represented by the curve D' of FIG. 5. It will be obvious that at this time the average level of voltage at point F minus the previously mentioned constant voltage will increase and be indicated on meter 52. This change in indication reflects the amount of twist or windup in the shaft. It is directly proportional to the new angle between the magnetic elements on the two disks. (This angle minus a constant angle is directly proportional to the torque applied to the shaft providing the shaft is linear and stable.) Potentiometer G has been included in the circuit to supply the constant voltage so that the meter response will be directly proportional to torque. The meter should be and is usually calibrated to be direct reading.

I claim:

1. Means for measuring angular displacement of coaxially rotating elements, comprising:
    (a) a magnetic record provided on each of said elements, said records being arranged in predetermined order and contrasting relationship to one another;
    (b) a pickup head stationarily supported adjacent said rotating elements to be traversed by the magnetic fields of the records thereon and generate a composite series of electrical pulses, certain pulses in said series being produced by and bearing a relation to the record on the first of said elements, the other pulses being produced by and bearing a relation to the record on the second of said elements, consecutive pulses produced by said first and second elements being spaced in point of time; and
    (c) a circuit connected with said head to receive said composite series of pulses therefrom, said circuit having electronic components and an indicator so connected that the electrical pulses received from said head will be converted to a form to cause said indicator to show the relative angular positions of said elements.

2. The measuring means of claim 1 in which means are provided to support said elements in a manner to cause the relative angular displacement to vary in response to the application of a force and correspondingly change the spacing in point of time of the consecutive pulses produced by said first and second elements, such change in time of the pulses being reflected on said indicator to show the amount of force applied to vary the angular displacement of said elements.

3. The measuring means of claim 2 in which the means for supporting said elements is a shaft and said elements are secured to rotate with axially spaced portions thereof.

4. The measuring means of claim 1 in which the coaxially rotating elements are spaced on the order of .005 inch and the magnetic records thereon coact with the same pickup head to generate electrical impulses with contrasting characteristics.

5. The measuring means of claim 1 in which the magnetic record on one rotating element has the polarities reversed from those of the record on the other rotating element.

6. The measuring means of claim 1 in which the magnetic records on the rotating elements comprise circumferentially spaced magnets of predetermined length arranged with the polarities of the magnets on one element reversed relative to the polarities of the magnets on the other element.

7. The measuring means of claim 6 in which the rotating elements are normally disposed to position the magnets on one element spaced substantially equally in circumferential order between the magnets on the other element.

8. The measuring means of claim 1 in which the pickup head has a C-shaped ferro-magnetic core and a single coil wound thereon, the air gap in said core extending transversely relative to the paths of the magnetic records on said rotating elements.

9. The measuring means of claim 1 in which the circuit has a single input connected with said pickup head to receive the composite series of electrical pulses therefrom.

10. The measuring means of claim 1 in which the magnetic records on the rotating elements are so oriented that two types of electrical pulses are generated in said pickup head, the first type of electrical pulse consisting of positive then negative portions and the second type consisting of negative then posiitve portions, the first and second types occurring alternatively in a series.

11. The measuring means of claim 10 in which the electronic components in the circuit are so connected that pulse portions of the same polarity in said composite series are utilized to produce a train of rectangular waves to drive the indicator to show the relative angular positions of said elements.

References Cited

UNITED STATES PATENTS

| | | | |
|---|---|---|---|
| 2,947,168 | 8/1960 | Yang | 73—136 |
| 3,049,003 | 8/1962 | Felder | 73—136 |
| 3,230,407 | 1/1966 | Marsh, Jr. | 310—168 |
| 3,295,367 | 1/1967 | Rundell | 73—136 |

FOREIGN PATENTS

| | | | |
|---|---|---|---|
| 968,503 | 9/1964 | Great Britain | 73—136 |

CHARLES A. RUEHL, Primary Examiner

U.S. Cl. X.R.

310—168